No. 784,998. PATENTED MAR. 14, 1905.
R. F. GEORGE.
FORCE PUMP.
APPLICATION FILED SEPT. 15, 1904.
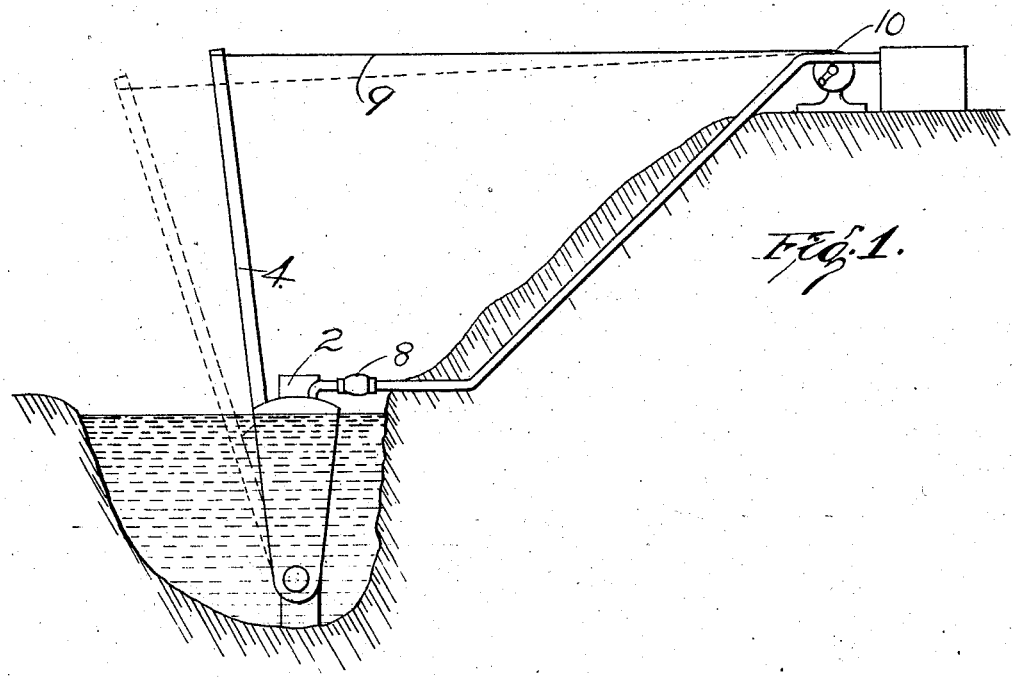
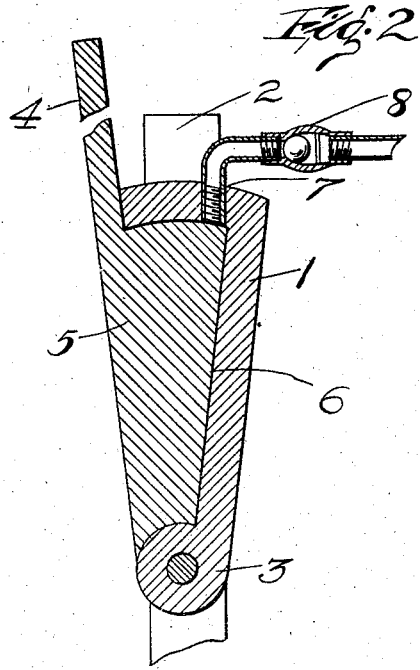
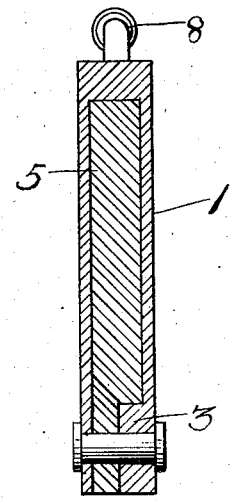
Witnesses
F. J. Veihmeyer
E. L. Rowzee
Inventor
RICHARD F. GEORGE
by Edson Bro's,
Attorneys No. 784,998. Patented March 14, 1905.

UNITED STATES PATENT OFFICE.

RICHARD F. GEORGE, OF PALMYRA, VIRGINIA.

FORCE-PUMP.

SPECIFICATION forming part of Letters Patent No. 784,998, dated March 14, 1905.

Application filed September 15, 1904. Serial No. 224,557.

*To all whom it may concern:*

Be it known that I, RICHARD F. GEORGE, a citizen of the United States, residing at Palmyra, in the county of Fluvanna and State of Virginia, have invented certain new and useful Improvements in Force-Pumps; and I do hereby declare the following to be a full, clear, and exact description of the invention, such as will enable others skilled in the art to which it appertains to make and use the same.

My invention relates to force-pumps.

It has for its object to provide a simple device particularly adapted for use by persons living in the country to bring water from a spring in a valley to a house located on a hill.

The invention consists in the details of construction hereinafter described and more particularly pointed out in the claims.

In the accompanying drawings, illustrating the preferred embodiment of my invention, Figure 1 is a sectional view showing the arrangement of my device in a spring, the piping up the hill to deliver in a tank at the summit, and the means for operating the device. Fig. 2 is a vertical cross-section view taken through the reservoir of the device. Fig. 3 is a vertical sectional view taken at right angles to the line upon which Fig. 2 is taken.

While the preferred embodiment of my invention is fully illustrated in the accompanying drawings and the construction and operation thereof is described in the following specification, the right is reserved to make such changes from the construction shown and described as the scope of the claims hereto appended will permit.

In carrying out my invention I secure a box or casing 1 in a nearly vertical position to a post or support 2 so that it is submerged in a spring, well, or reservoir. Pivoted or hinged near the bottom of said casing, as at 3, is a long arm or lever 4, extending up out of the water and as high as desired. Said arm or lever has a laterally-projecting portion 5, adapted to fit a recess or dished-out portion 6 of the casing when the lever is in a forward or closed position. An aperture 7 through the casing communicates with said recess inwardly and outwardly, has pipes connected thereto running, preferably underground, up the hill to the storing-reservoir, which may be located in or near the house. A suitable check-valve 8 is arranged in the pipe, preferably near the casing. Said casing and the long lever when closed are somewhat inclined away from the hill or raised ground to which it is desired to force the water. A wire or rope 9 is attached to the upper end of the lever and to a windlass 10 on the hill. The lever may be of sufficient weight in itself or it may be weighted, or a spring may be interposed between said lever and the casing to cause said lever to swing back when the wire or rope is slackened until the portion 5 is withdrawn from the casing to permit the recess in said casing to fill with water. By winding the rope upon the windlass the lever is drawn forward, thrusting its projection into the recess of said casing and forcing the water from said casing up through the pipe to the storing-reservoir on the hill.

Having thus described my invention, what I claim as new, and desire to secure by Letters Patent, is—

1. In a device of the character described, a casing adapted to be mounted in a submerged position, a single-armed lever hinged at its lowest extremity to said casing and having a projecting portion adapted to fit said casing, means to operate said lever to force the water from said casing and means to convey the water to a storing-receptacle.

2. In a device of the character described, a casing mounted vertically in a submerged position, a single-armed lever hinged at its lowest extremity to said casing and extending upwardly, said lever having a projecting portion adapted to fit said casing, means to operate said lever to force the water from said cavity and means to convey the water to a storing-receptacle.

3. In a device of the character described, a casing mounted vertically in a submerged position, a single-armed lever hinged at its lowest extremity to said casing and extending upwardly, said lever having a projecting portion adapted to fit said casing, means to withdraw said projecting portion from the casing to permit the latter to fill, means to operate said lever to force the water from said casing and means to convey the water to a storing-receptacle.

4. In a device of the character described, a casing mounted vertically in a submerged position, a single-armed lever hinged at its lowest extremity to said casing and extending upwardly, said lever having a projecting portion adapted to fit said casing, means to withdraw said projecting portion from the casing to permit the latter to fill, a windlass and line connected to the upper extremity of the lever to operate the same to force the water from said casing, and means to convey the water to a storing-receptacle.

In testimony whereof I affix my signature in presence of two witnesses.

RICHARD F. GEORGE.

Witnesses:
 JNO. R. HADEN,
 FRANK W. SHEPHERD.